APPARATUS FOR DETERMINING THE POSITION OF AN EDGE

Filed June 20, 1968 — 3 Sheets-Sheet 1

INVENTORS
KNUT HEITMANN
ECKART SCHNEIDER
By Krafft & Wells
ATTORNEYS

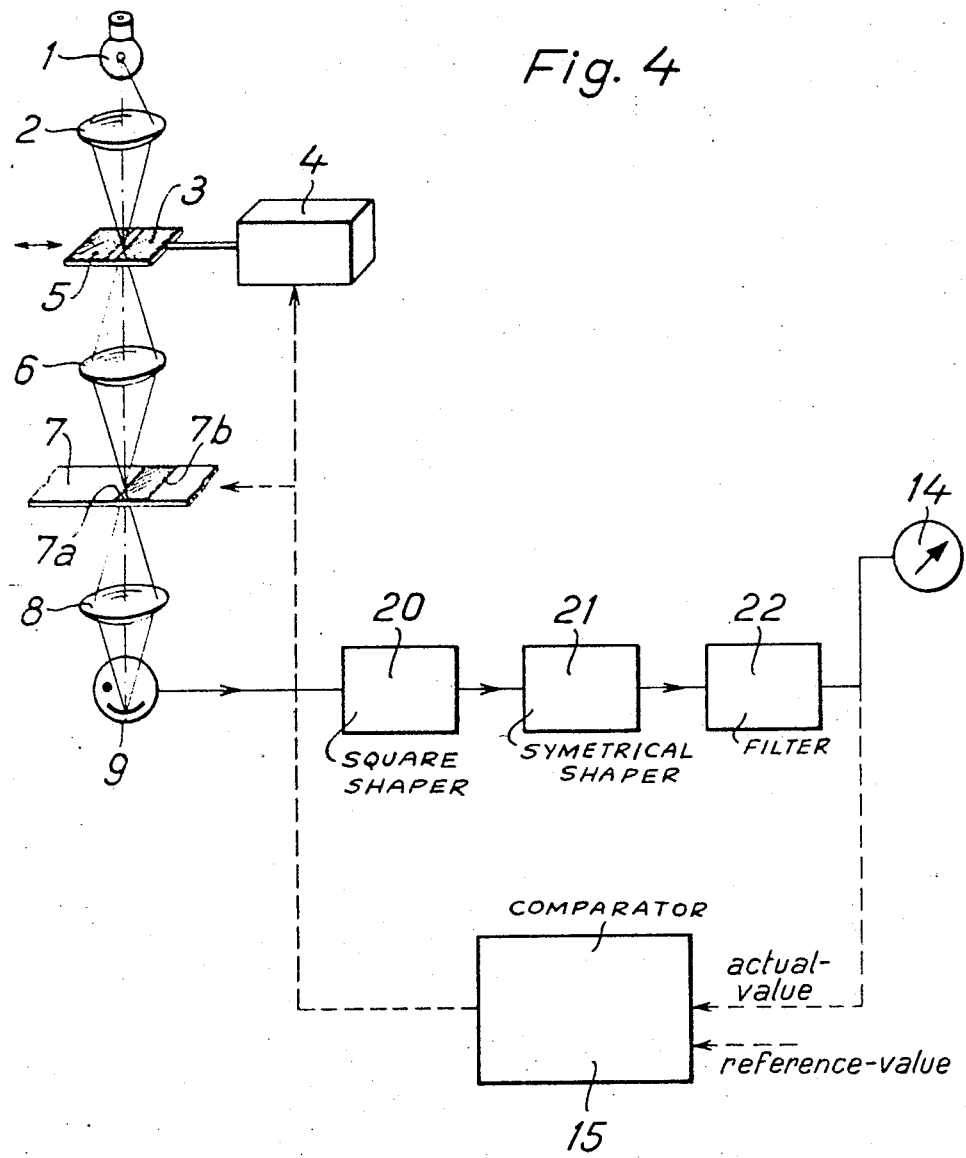

United States Patent Office 3,565,532
Patented Feb. 23, 1971

3,565,532
APPARATUS FOR DETERMINING THE POSITION OF AN EDGE
Knut Heitmann, Wetzlar, and Eckart Schneider, Asslar, Kreis Wetzlar, Germany, assignors to Ernst Leitz GmbH, Wetzlar, Germany
Filed June 20, 1968, Ser. No. 738,446
Claims priority, application Germany, June 24, 1967, P 16 23 764.2; June 28, 1967, P 16 23 765.3, P 16 23 766.4
Int. Cl. G01b 11/00; G01d 5/36
U.S. Cl. 356—167                                  8 Claims

ABSTRACT OF THE DISCLOSURE

An apparatus is disclosed which comprises a light source and means for oscillatory scanning of the edge of an object by means of a light beam which after scanning is incident on a photoelectric receiver. In a first embodiment of the invention the electric pulses generated by the receiver are supplied to a differentiating stage with full wave rectifier which is connected to a known circuit arrangement for the evaluation of electric signals obtained by the scanning of scale marks.

In a second embodiment the pulses are conducted to a differentiating stage with a resonant amplifier that is tuned to an even-number multiple of the scanning frequency. To the output terminals of that amplifier is connected a phase-sensitive rectifier which is controlled by a reference signal derived from the scanning motion. The output signals of this amplifier are then evaluated in known manner, for example by an indicating means.

In a third disclosed embodiment the pulses are conducted to a square shaper whose output is serially connected to a symmetrical shaping stage which is connected to a low-pass filter and an evaluation device, for example a comparison stage.

CROSS-REFERENCE TO RELATED APPLICATIONS

Applicants claim priority under 35 U.S.C. 119 for applications:

No. P 16 23 764.2 (previously No. L 56,829), filed June 24, 1967,
No. P 16 23 765.3 (previously No. L 56,857), filed June 28, 1967, and
No. P 16 23 766.4 (previously No. L 56,858), filed June 28, 1967 in the Patent Office of Germany.

Reference is further made to U.S. Pat. No. 3,331,964, issued July 18, 1967, to Klaus Heinecke and Werner Holle and assigned to the same assignee as the present application.

BACKGROUND OF THE INVENTION

(1) Field of the invention

The present invention relates to a measuring device and more particularly to a device for determining the position of an edge of an object relative to a reference point or mark to an accuracy within the normal range of an optical microscope by means of an oscillating beam of light, a photoelectric receiver, and an electric evaluation circuitry.

(2) Description of the prior art

Measuring methods for determining the position of a mark with high accuracy by means of a photoelectric equipment are already known to those skilled in this particular art. The mark whose position is to be measured or determined presents itself always either as dark line against a bright background or, vice versa, as a bright line against a dark background. When using the prior art devices during measurement always the full width of the line is scanned or measured, which means that the position of both edges of the line and its photometric profile help to produce and determine the obtained measurement signal or pulse. For this reason, the known methods and devices are not suitable if the position of only one edge of an object or mark is to be determined.

However, the problem of determining the position of only one edge to an accuracy within the range of a microscope arises in an increasing number of cases, for example, if coded scales are to be measured, or with masks for vapor deposition which are needed and used for the production of semi-conductors or if the structure of the manufactured semi-conductors is to be controlled. In all these cases the necessity exists to measure and determine the exact position of an edge, i.e. the position of the transitional line of a bright and dark zone.

Since especially the progress of the semi-conductor technology requires an increasing accuracy in the measurement and determination of the position of edges it is an object of the invention to provide an apparatus that is capable of more precisely determining an edge position than are the prior art devices. It is a further object to provide an apparatus by which a photoelectric method for the determination of edge positions can be performed.

SUMMARY OF THE INVENTION

According to the invention these objects are attained by providing an apparatus which comprises means adapted to generate an oscillating bundle of light rays by means of which the edge or mark can be scanned. The apparatus further includes a photoelectric receiver whereupon the light rays are incident after having scanned the edge of the object. From the receiver are obtained electric signals or pulses and the invention includes three different ways in which these pulses may be evaluated, each way being reduced to practice in a different embodiment as described in more detail hereinafter.

In a first embodiment the pulses are conducted to a differentiator to which a full wave rectifier is serially connected. The latter being further connected to a circuit arrangement for the evaluation of electric signals as they are obtained from the scanning of scale marks. Circuitries of this nature are known per se and are disclosed, for example, in U.S. Pat. No. 3,331,964.

Between the photoelectric receiver on one side and the differentiator on the other side as well as between the full wave rectifier and the evaluation circuitry there can be provided two synchronously operable switches. By means of the latter it is possible either to connect the evaluation circuitry directly to the photoelectric receiver or to introduce between receiver and circuitry the mentioned differentiator and full wave rectifier. Differentiator and full wave rectifier may together be disposed in a common housing or block moulding.

In a second embodiment the pulses are conducted to a differentiator which is connected in series to a resonant amplifier, the latter being tuned to an even-number multiple of the scanning frequency. The amplifier output terminals are connected to a phase-sensitive rectifier that is controlled by a reference signal derived from the scanning motion. The output signals of the rectifier, i.e. their magnitude and polarity, represent a measure of the distance of the edge from the optical axis of the apparatus. These signals are then evaluated, for example they are conducted to an indicating instrument whereby a visual indication of the position of the edge is provided.

In a third embodiment the pulses produced by the photoelectric receiver are conducted to a square shaper preferably having an adjustable trigger level and from there to a balancer. The balancer is in series with a low-pass filter to which at least one evaluation device is connected, for example a comparison stage.

DESCRIPTION OF THE DRAWINGS

The invention will be more readily comprehended and other advantages will become more apparent from the following description when taken in connection with the appending drawings wherein:

FIG. 4 shows schematically a third embodiment of the measuring apparatus wherein transmitted light is used.

Figure 1:
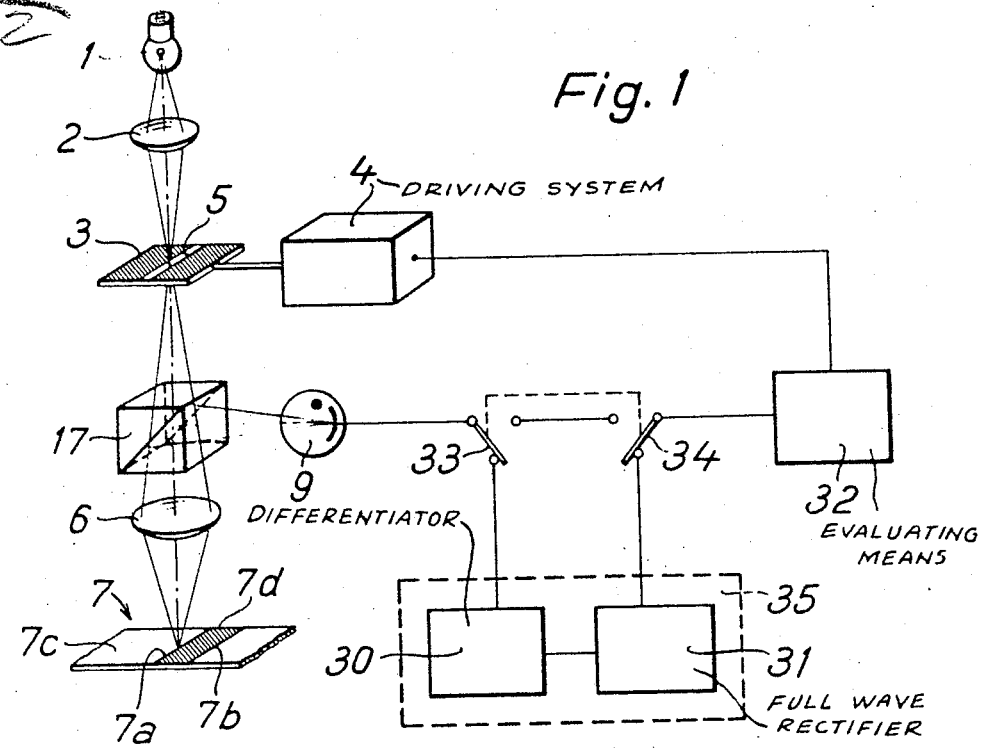
FIG. 1 shows schematically a first embodiment of the measuring apparatus wherein reflected light is used.

The instrument shown in FIG. 1 works with reflected light. The lamp 1 shines through the condenser 2 on to the diaphragm 3 which contains a slit 5. Oscillatory motion is imparted to this diaphragm by a driving system 4, such as a solenoid system or a motor. The light rays pass through a beam-splitter cube 17, and the objective lens 6 forms an image of the illuminated slit 5 (which, alternatively, may be autoluminescent) in the non-transparent object plane 7. In this plane is an object with reflecting surfaces 7c and a blackened portion 7d. The amplitude of vibration of the diaphragm 3 is made such that the beam of light impinging on the object can sweep only the edge 7a thereof, and not—when the object remains in the same position—the edge 7b as well. The reflected components of the light pass by way of the objective 6 and beam splitter 17 to the photoelectric receiver 9 which is followed by the differentiator 30. The output signals therefrom which include both polarities in alternate symmetry about the zero level, are modified by a full wave rectifier 31 in such a way that only positive signal components remain. These are fed to one circuit arrangement 32 of conventional type as used for evaluating signals produced by the scanning of scale lines (such as is disclosed in U.S. Pat. No. 3,331,964) which receives its reference signals from the driving system 4. Between the photoelectric receiver 9 and the differentiator 30, and between the rectifier 31 and the circuit arrangement 32, are two-position switches 33 and 34 respectively, which are coupled together for simultaneous switching, each being connected through one switch contact to a switch contact of the other. These switches 33 and 34 make it possible to connect the receiver 9 directly to the circuit arrangement 32 and then to use the instrument in the conventional manner for measuring scale marks.

The advantage of this instrument is that it can be used optionally either for measuring scale marks or for measuring edges. On the other hand, by the interposition of units 30 and 31, many existing instruments intended for measuring scale marks can be converted into edge-measuring instruments.

Any of the conventional evaluation circuits designed for scanning scale marks are suitable for this purpose, if they supply a discriminator voltage which corresponds to the displacement of the measured object in relation to the sighting axis of the optical system.

For evaluation methods in which the higher harmonic spectrum of the pulse train is used as the scanning criterion, the quality demanded of the full wave rectifier is high, because the rectifying process cannot be allowed to cause additional distortion of the pulse shape. The circuit arrangement shown in FIG. 2 which includes both, the differentiator 30 and the full wave rectifier 31 can be used to advantage here.

Figure 2:
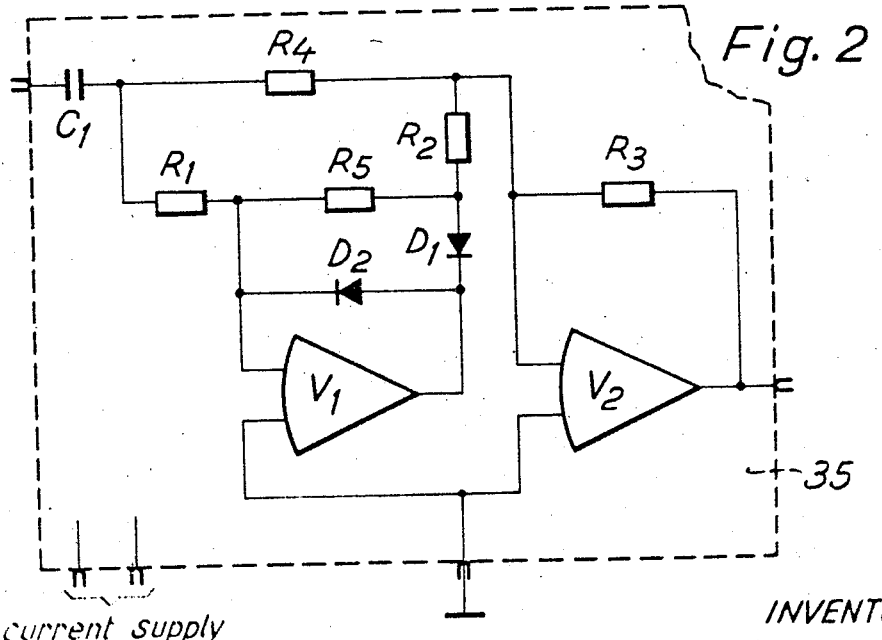
FIG. 2 is a special wiring diagram of the differentiator and the full wave rectifier as used in the embodiment illustrated in FIG. 1.

In the circuit shown in FIG. 2, the capacitor $C_1$, the ohmic resistor $R_4$ and the ohmic resistor $R_3$ are in series. The ohmic resistors $R_1$, $R_5$ and $R_2$, in series with one another, are joined in parallel to the resistor $R_4$. The resistor $R_5$ is bridged by two rectifiers $D_1$ and $D_2$, which are connected in series and work in the same direction as each other. One computing amplifier $V_1$ has its input connected to the junction point between the components $R_1$ and $D_2$ and its output connected to the junction point between the components $D_1$ and $D_2$. A second such amplifier $V_2$ has its input connected to the junction point between the components $R_4$ and $R_3$ and its output to the other side of the resistor $R_3$. The diodes in the return path of the amplifier $V_1$ ensure that any effects of the non-linear nature of the pass characteristics of the amplifier on the shape of the individual impulse are eliminated.

The arrangement shown in FIG. 2 can be accommodated as a unit in a case or a block moulding, as indicated by the broken line 35 in the diagram. The insertion of these units then enables existing instruments for line measurement to be readily converted or supplemented for edge measuring.

The instrument seen in FIG. 1 can naturally also be equipped with illumination to provide transmitted light. The photoelectric receiver is then placed below the object, which in this case is transparent. The splitter 17 is dispensed with. A further possibility, by way of variation from the arrangement illustrated, is to insert the diaphragm 3, for example, between the object and the photoelectric receiver.

Figure 3:
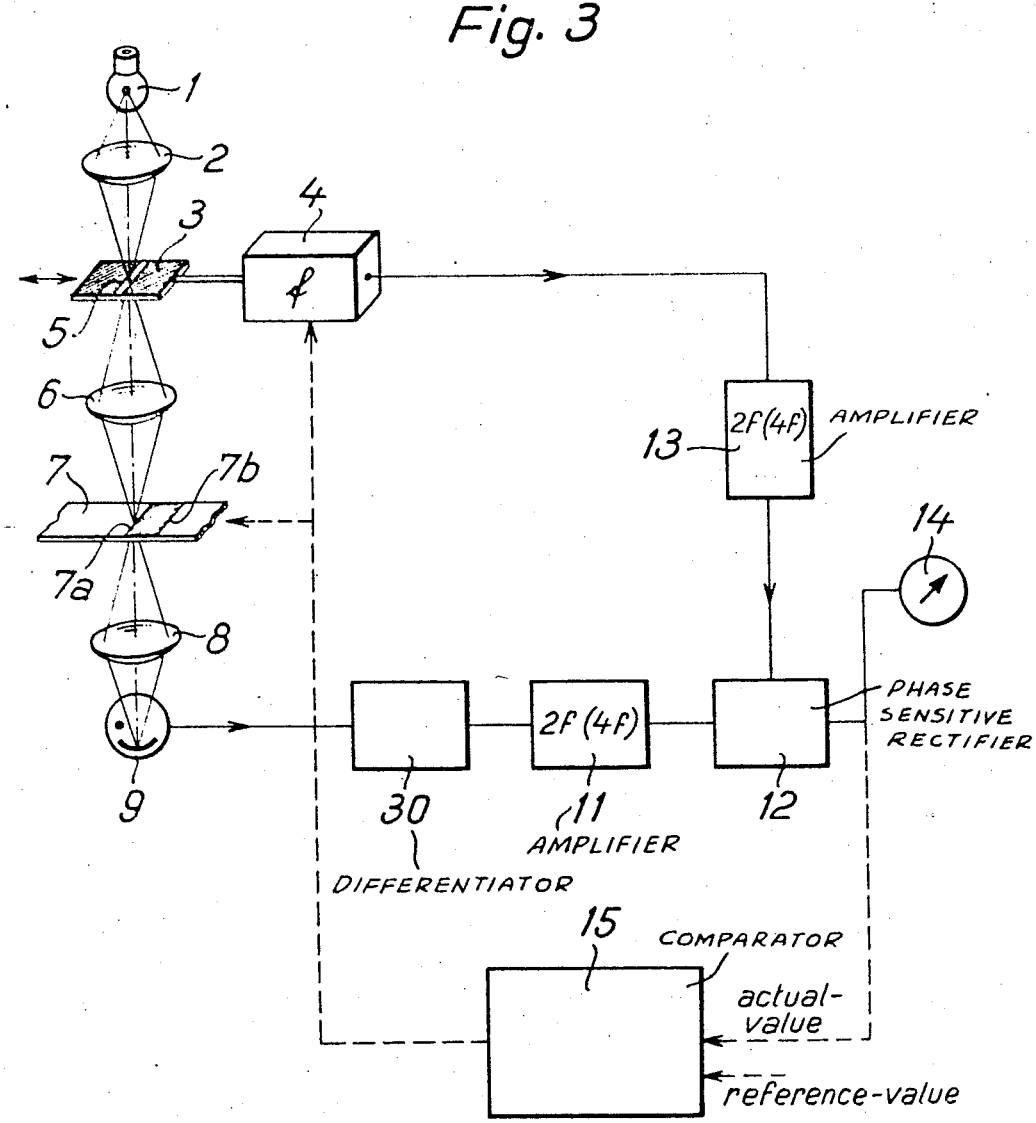
FIG. 3 shows schematically a second embodiment of the measuring apparatus.

In the embodiment shown in FIG. 3, in which corresponding parts are numbered the same as in FIG. 1, the lamp 1 shines through the condenser 2 on to the diaphragm 3 which contains a slit 5. Oscillatory motion is imparted to the diaphragm 3, as indicated by the double-headed arrow, by a driving system 4, such as a motor or a solenoid system. In place of the slit 5, however, the diaphragm may be provided, here too, with a suitably shaped means of autoluminescence. The slit illumination from the diaphragm forms an image via the objective 6 in the plane of the object 7. The light rays passing through the partly transparent object are led through the objective 8 to the photoelectric receiver 9.

If the object has a light-to-dark edge 7a and if the amplitude of vibration of the diaphragm 3 is made such that the boundary 7b of the blackened portion cannot be swept by the light beam during scanning of the edge 7a, the output signals from the receiver 9 are of meandering shape. These signals are fed to a differentiator 30 which is followed by a resonance amplifier 11. This amplifier is tuned to an even-number multiple of the frequency $f$ at which the scanning movement of the diaphragm 3 takes place. The output terminals of this amplifier 11 are connected to a phase-sensitive rectifier 12, to the second input of which is connected a resonance amplifier 13 tuned to the same multiple of the frequency $f$ as the amplifier 11 and controlled by the driving system 4. The magnitude and polarity of the output signals of the rectifier 12 are proportional to the displacement of the measured edge in relation to the sighting axis of the optical system. They can be indicated by a measuring instrument 14 and/or used for control purposes. For the latter purpose, the signals may be fed as the actual value, along with signals representing the desired value, to a comparator 15. The output signals from this comparator 15 can be used, for example, for balancing the instrument. Two possibilities here are indicated in broken line in the drawing. On the one hand, these signals can be used for moving the object 7 from its actual position to the desired position; on the other hand, the line of rest of the vibrating diaphragm may be moved as described, for example, in the British Pat. No. 997,915.

Finally, FIG. 4 in which corresponding parts are numbered the same as in FIG. 1, shows an instrument in which a lamp 1 shines through the condenser 2 on to the diaphragm 3 which contains a slit 5. Oscillatory motion is imparted to the diaphragm by some conventional driving system, such as a solenoid or a motor, as indicated by the double-headed arrow. In place of the slit, a suitably shaped autoluminescent body may be attached to the diaphragm, in which case the lamp 1 and condenser 2 will not be needed. An image of the illuminated surface on the diaphragm 3 is formed by the objective 6 in the object plane 7. This plane contains the edge 7a that is to be measured, lying parallel to the direction of the illuminated surface on the diaphragm. The amplitude of vibration of the diaphragm 3 is made such that the oscillating beam of light does not pass beyond the edge 7b of the object. The light components passing through the object are led through the objective lens 8 to the photoelectric receiver 9.

The electrical signals obtained at the output of the photoelectric receiver 9 during scanning are of meandering shape. They are fed to a square shaper 20 having a presettable trigger level. The advantage of this is that the pre-set level can be made to correspond to any desired blackening value in the edge that is to be scanned; for it is recognized that an edge represents a constant transition from light to dark over a limited space. The square shaper 20 is followed by a symmetrical shaping stage 21 which may take the form, for example, of a push-pull switching amplifier or a limiter giving zero-line symmetry. This stage 21 shifts the extreme values of the square shaper 20 output signals so that they lie symmetrically about zero potential. These shifted signals are then fed to a low-pass filter 22, the output of which carries a D.C. voltage equal to the arithmetic mean of the square-wave voltage. Because of the zero-line symmetry of the square-wave signals, this mean value is governed only by the mark-space ratio of the square-wave signals and hence directly by the position of the scanned edge in relation to the sighting axis of the optical system. This ratio becomes 1:1 and the arithmetic mean value becomes zero when the position of the edge coincides with the sighting axis. It is of special advantage here that the sensitivity of the new instrument can be increased to almost any desired degree by judicious choice of the square-wave amplitude.

The D.C. voltage referred to can be indicated with the aid of an indicating instrument 14, and/or fed, for example, as an actual-value magnitude to a comparator 15, to which a voltage representing the reference input is also fed. The output signals from this comparator can be used for control purposes, as already described in connection with FIG. 3. It is also possible, of course, to use reflected light instead of the transmitted light shown in the drawing. Here again, the diaphragm may be interposed in the light path between the object and the photoelectric receiver, instead of in the position illustrated.

From the foregoing it will be seen that the above described apparatuses provide for the measurement of the edge of an object whether it be an object as such or purely a marker line. The above described instruments are particularly suitable for measuring coded scales and the masks used for vapor deposition as required in the manufacture of semi-conductors for example as well as for measuring finished semi-conductor structures.

What is claimed is:

1. Apparatus for determining the position of the edge of an object to an accuracy within the normal range of an optical microscope, said apparatus comprising in combination:
   a light source;
   means producing an oscillating light beam for scanning said edge of said object,
   a photoelectric receiver whereupon said oscillating light beam is incident after scanning said object, said receiver converting the optical signals into electric pulses,
   a differentiator serially connected to said photoelectric receiver,
   a full wave rectifier connected to said differentiator, and
   means for evaluating the output signals of said rectifier.

2. Apparatus for determining the position of the edge of an object according to claim 1 and further comprising a first switch provided between said photoelectric receiver and said differentiator and a second switch provided between said full wave rectifier and said means for evaluating, said switches mechanically connected so as to be operable together, thereby connecting either the means for evaluating directly to the photoelectric receiver or introducing electrically the differentiator and the full wave rectifier.

3. Apparatus for determining the position of the edge of an object according to claim 2 wherein the differentiator and the full wave rectifier are combined as a unit in a separate housing.

4. Apparatus for determining the position of the edge of an object according to claim 1 wherein the differentiator and the full wave rectifier comprise:
   two ohmic resistors ($R_3$, $R_4$) in series connection, three ohmic resistors ($R_1$, $R_2$, $R_5$) in series with one another, said resistors being joined in parallel to said resistor ($R_4$),
   two rectifiers ($D_1$, $D_2$) connected in series and working in the same direction, said rectifiers bridging said ohmic resistor ($R_5$),
   a first computing amplifier ($V_1$) having its input connected to the junction point between said ohmic resistor ($R_1$) and said rectifier ($D_2$) and having its output connected to the junction point between said rectifiers ($D_1$) and ($D_2$),
   a second computing amplifier ($V_2$) having its input connected to the junction point between said ohmic resistors ($R_3$) and ($R_4$) and having its output connected to the other side of said ohmic resistor ($R_3$),
   said rectifiers ($D_1$, $D_2$) in the return path of said first amplifier ($V_1$) eliminating any non-linear effects of the path characteristic of said amplifier (VI) on the shape of the pulses.

5. Apparatus for determining the position of the edge of an object to an accuracy within the normal range of an optical microscope, said apparatus comprising in combination:
   a light source,
   means producing an oscillating light beam for scanning said edge of said object,
   a photoelectric receiver whereupon said oscillating light beam is incident after scanning said object, said receiver converting the optical signals into electric pulses,
   a differentiator in series connection with said photoelectric receiver,
   a resonant amplifier connected to said differentiator, said amplifier tuned to an even-number multiple of the scanning frequency,
   a phase-sensitive rectifier gated by a reference signal derived from the scanning motion to which rectifier the pulses from said amplifier are fed, the output signals of said rectifier in magnitude and polarity providing a measure of the position of the edge relative to the zero point of the scanning motion.

6. Apparatus for determining the position of the edge of an object to an accuracy within the normal range of an optical microscope, said apparatus comprising in combination:
   a light source, means producing an oscillating light beam for scanning said edge of said object, a photoelectric receiver whereupon said oscillating light beam is incident after scanning said object, said receiver converting the optical signals into electrical pulses, a square shaper connected to said photoelectric receiver, a symmetrical shaping stage connected to the output of said square shaper, a low-pass filter following said symmetrical stage, and means for evaluating connected to said filter, said means providing an indication of the position of the object edge relative to the zero point of the scanning motion.

7. Apparatus for determining the position of the edge of an object according to claim 6 wherein said square shaper has an adjustable trigger level.

8. Apparatus for determining the position of the edge of an object according to claim 6 wherein said means for providing an indication of the object edge position comprises a comparison stage.

References Cited

UNITED STATES PATENTS

| | | | |
|---|---|---|---|
| 2,792,504 | 5/1957 | Slamar et al. | 250—219Rg |
| 3,055,263 | 9/1962 | Kuehne | 356—170 |
| 3,108,727 | 10/1963 | Farber | 250—219Rg |
| 3,254,227 | 5/1966 | Hock | 356—170 |
| 3,305,691 | 2/1967 | Hock | 250—232 |
| 3,317,739 | 5/1967 | Larraburu et al. | 250—232 |
| 3,331,964 | 7/1967 | Heinecke et al. | 250—232 |
| 3,335,281 | 8/1967 | Willits | 356—172 |
| 3,454,776 | 7/1969 | Hock | 356—172 |

FOREIGN PATENTS

| | | | |
|---|---|---|---|
| 1,191,591 | 1965 | Germany | 250—219(Wd) |

RONALD L. WIBERT, Primary Examiner

J. ROTHENBERG, Assistant Examiner

U.S. Cl. X.R.

250—219, 232; 356—170, 172